Nov. 13, 1923.
P. SHERMAN
WINDSHIELD WIPER
Filed May 15, 1922
1,474,006
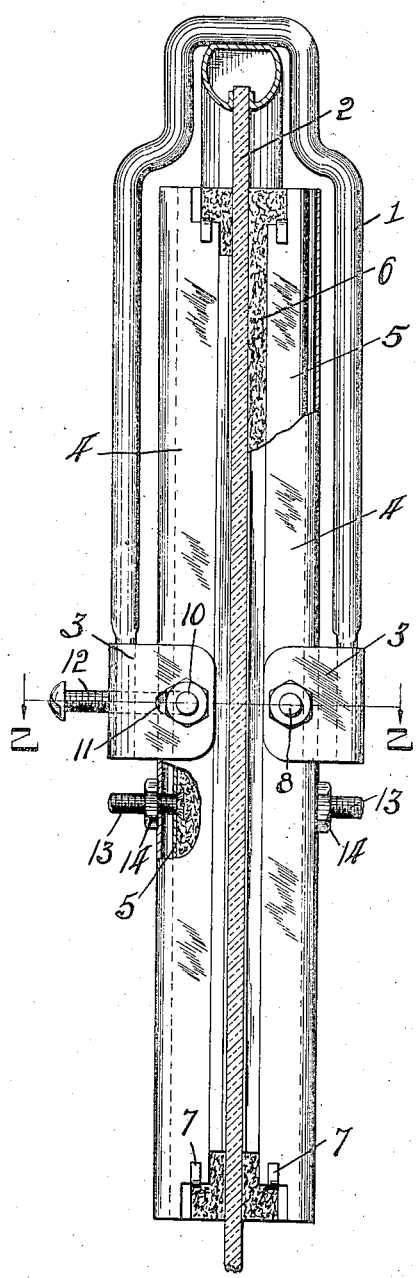
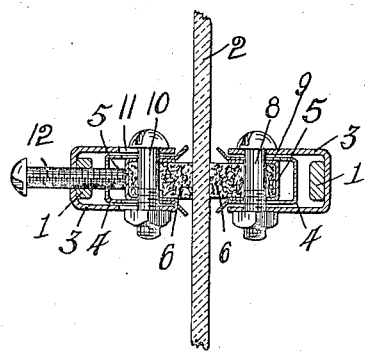
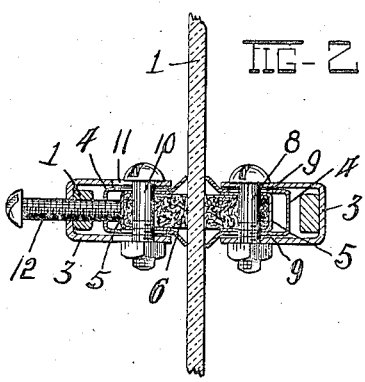
INVENTOR
Phillip Sherman,
By Owen Owen & Crampton.
Attys.

Patented Nov. 13, 1923.

1,474,006

UNITED STATES PATENT OFFICE.

PHILLIP SHERMAN, OF TOLEDO, OHIO.

WINDSHIELD WIPER.

Application filed May 15, 1922. Serial No. 561,073.

*To all whom it may concern:*

Be it known that I, PHILLIP SHERMAN, a citizen of Poland, and a resident of Toledo, in the county of Lucas and State of Ohio, have made an invention appertaining to a Windshield Wiper; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to windshield wipers, and has for its object the provision of a device of this character which combines both a scraping means, for cleaning sleet and ice from the windshield, and a soft wiping means, for wiping water from the windshield, said means being relatively adjustable to place either in operative position.

The invention is fully described in the following specification, and while, in its broader aspect it is capable of embodiment in numerous forms, a preferred embodiment thereof is illustrated in the accompanying drawings, in which,—

Fig. 1 is an elevation of a device embodying the invention in operative relation to a windshield with parts broken away and with the windshield in section. Fig. 2 is a section on the line 2—2 in Fig. 1 with the sleet scraping means in engagement with the windshield, and Fig. 3 is a similar section with the yielding wiping means in engagement with the windshield.

Referring to the drawings, 1 designates the holder or wiper member carrying frame of the device, which frame is of U-form to adapt it to straddle the upper portion of a windshield 2 and to have reciprocatory movements lengthwise thereof. Each arm of the frame 1 is provided at its terminal portion with a looped member 3 of U-form in cross-section, with the cross-bar portion thereof straddling and fixedly connected to the respective frame arm and with its open end projecting inward toward the open end of the other member 3.

The wiping and scraping means on each leg of the frame of the device comprises a pair of channel-bars 4 and 5 being disposed one within the other for relative inward and outward movements, the inner channel-bar carrying a wiper strip 6 of felt or other suitable soft wiping material, which is gripped between the legs of the bar and projects a distance from its free edge to adapt it to have wiping engagement with the windshield 2.

The outer channel-bar 4, which constitutes the scraping member of the device is of greater depth than the combined depth of the wiper members 6 so that the latter may be disposed entirely therein to permit the free edges of the outer channel bar legs or flanges to have scraping contact with the adjacent windshield surface. To facilitate the scraping action the terminal edge portions of the legs or flanges of the bar 4 are preferably turned outward at an incline to the surface to be wiped, as shown in Figs. 2 and 3.

Each channel-bar 5 preferably has a finger 7 struck out from its sides at each end thereof and turned back over a respective end portion of the associated enclosing bar 4 for sliding engagement therewith transversely thereof. These fingers perform a double function, namely, of retaining the bars 4 and 5 of each set in relative sliding engagement to permit relative inward and outward adjusting movements thereof, and to resist an outward sliding of the legs or side flanges of the sleet scraping channel-bar 4.

A scraper-bar 4 with its enclosed bar 5, is mounted within the open inner end of each frame loop 3 and is pivotally connected thereto substantially centrally of its ends by a bolt or pivot pin 8. The bolt 8 for one frame loop 3 preferably has a pivotal bearing in the loop sides and projects through transversely disposed slots 9 in the sides of the outer channel-bar 4 and projects pivotally through the sides of the inner channel-bar 5, thus permitting both channel-bars to have pivotal movements relative to the frame 1 and permitting the outer scraper-bar 4 to have inward and outward transverse adjusting movements relative to the bar 5 and its wiping strip to place the scraping edges of the bar 4 into or out of coacting relation to the windshield, as shown in Figs. 2 and 3. The other frame loop 3 which is preferably the one disposed at the inner side of the windshield has a pivot pin or bolt 10 projecting through slots 11 in its sides which slots are disposed transverse to the windshield, and the bolt then extends through the bars 4 and 5 in the same manner as described in connection with the other set so as to permit relative inward and outward adjusting movements of the two bars to place the wiping edge in end coaction with the windshield. The provision of the slots 11 in the frame loop enable the associated set of bars 4 and 5 to be moved inward or outward with respect to the windshield to suit the thickness of the windshield and the pressure with which it is desired to grip the opposed sides of the windshield by the wiping or scraping members.

The inward and outward adjustment of the transversely adjustable bar 5 with respect to its carrying loop 3 is effected by the adjustment of a set-screw 12, which is threaded through the looped end or cross-bar of the member 3 and the adjacent frame arm by which it is carried, and then extends freely through an opening in the looped or cross-bar portion of the associated channel-bar 4 and bears at its inner end against the looped or cross-bar portion of the associated bar 5. It is evident that a tightening of the screw 12 will increase the pressure of the wiping strips 6 against the windshield glass and that a loosening of the screw will release such pressure.

Each bar 5 has a threaded stem 13 projecting outward from its loop or cross-bar portion directly through a registering opening in the looped or cross-bar portion of the enclosing bar 4 and has a nut 14 threaded on its outer end for coaction with the outer side of the bar 4. It is evident that a tightening of the nuts 14 will force the bars 4 inward with respect to the bars 5 a desired extent to cause the scraping edges of the bars 4 to have scraping coaction with the windshield surfaces to clean the same of sleet or ice, and that a loosening of the nuts will permit the bars 4 to move outward or to retract from scraping engagement with the windshield a sufficient extent to prevent a scraping action on the windshield when the wiper is moved and to permit the felt strips 6 to alone have cleaning coaction with the windshield.

The pressure of the windshield against the channel bars 4 is sufficient to force them outward and to permit the strips 6 to have wiping engagement with the windshield when the nuts 14 are loosened. If it is desired to withdraw the wiper strips 6 from engagement with the windshield when the bars 4 are in scraping engagement therewith, the screw 12 may be loosened to permit a retraction of the wiper strips and their carrying bars 5 from the windshield.

It is evident that I have provided a windshield wiper which combines a scraping means with a yielding wiping means, either of which may be placed in operative coaction with the windshield to suit the conditions of use, and that a relative adjustment of the two wiping means both with respect to each other and to the windshield may be easily and quickly effected.

I wish it understood that my invention is not limited to any specific construction, arrangement or form of the parts, as it is capable of embodiment in numerous forms without departing from the spirit of the claims.

Having thus described my invention, what I claim as new, and desire to secure by Letters Patent, is,—

1. A windshield wiper having a U-shaped holder for straddling a windshield, wiper and scraper members carried by one arm of the holder for relative adjustment to place either in engagement with one side of the windshield, and means carried by the other arm of the holder to bear upon the opposite side of the windshield to press the scraper and wiper members against the windshield.

2. A windshield wiper having a U-shaped holder for straddling a windshield, wiper and scraper members carried by one arm of the holder for relative adjustment to place either in engagement with one side of the windshield and disposed one within the other, and means carried by the other arm of the holder to bear upon the opposite side of the windshield to press the scraper and wiper members against the windshield.

3. A windshield wiper having a U-shaped holder for straddling a windshield, a channel-bar carried by one arm of the holder, and having scraping edges for engagement with one side of the windshield, a wiper member mounted in the channel-bar, the channel-bar and wiper member being relatively adjustable to place either in operative engagement with the windshield, and means carried by the other arm of the holder for bearing against the opposite side of the windshield to press the bar or wiper member against the windshield.

4. A windshield wiper having a U-shaped holder for straddling a windshield, a scraper bar and a wiper member disposed one within the other and pivotally carried by one arm of the windshield, said bar and wiper member being relatively adjustable to place either in operative engagement with a side of the windshield, and means carried by the other arm of the holder for bearing upon the other side of the windshield to press the bar or wiper member against the windshield.

5. A windshield wiper having a U-shaped holder for straddling a windshield, a scraper member and a wiper member carried by one arm for rocking movements relative thereto and for relative adjustment toward and away from the windshield to place either in operative engagement with a side thereof, means operable to relatively adjust the members, and means carried by the other arm of the holder for bearing upon the other side of the windshield to press the opposing member against the windshield.

6. A windshield wiper having a U-shaped holder for straddling a windshield, a scraper member and a wiper member carried by one arm for rocking movements relative thereto and for relative adjustment toward and away from the windshield to place either in operative engagement with one side thereof, means operable to relatively adjust the members, means adjustably connecting the holder and one of said members to vary the pressure of the same against the windshield, and means carried by the other arm of the holder for bearing against the windshield in opposition to the pressure of said member against the windshield.

7. A windshield wiper comprising a U-shaped holder for straddling a windshield, a channel-bar carried by one arm of the holder for rocking movements relative thereto and having its free edges adapted to have scraping engagement with a windshield side, a second channel-bar pivotally carried within the first channel-bar by the holder arm and having a soft wiper strip for engagement with a side of the windshield, said bars being mounted for relative inward and outward adjustment to place either in operative engagement with the windshield, means connecting the bar for effecting such adjustment, and means carried by the other arm of the holder for bearing against the other side of the windshield to press the scraper bar and wiper against the windshield.

8. A windshield wiper comprising a U-shaped holder for straddling a windshield, a pair of channel-bars carried by each arm of the holder with one bar of each pair acting as a windshield scraper member and with the other bar disposed within the scraper bar and acting as a windshield wiper member, one of the bars of each pair being capable of inward and outward adjustment relative to the other to permit either to be placed in engagement with a windshield, and means for effecting such relative adjustment of the bars of each pair.

In testimony whereof I have hereunto subscribed my name to this specification.

PHILLIP SHERMAN.